United States Patent [19]

Mori

[11] 4,189,525
[45] Feb. 19, 1980

[54] BEARING METAL FOR LARGE ENGINES

[75] Inventor: Sanae Mori, Nagoya, Japan

[73] Assignee: Daido Metal Company, Ltd., Tokyo, Japan

[21] Appl. No.: 945,997

[22] Filed: Sep. 26, 1978

Related U.S. Application Data

[63] Continuation-in-part of Ser. No. 795,331, May 9, 1977, abandoned.

[30] Foreign Application Priority Data

Nov. 15, 1977 [JP] Japan .................................. 52-54620

[51] Int. Cl.$^2$ ...................... B32B 15/00; B32B 15/20
[52] U.S. Cl. ............................. 428/643; 75/134 B; 75/140; 75/175 R; 428/646; 428/648; 428/653; 428/654; 428/684
[58] Field of Search ............... 428/643, 646, 648, 653, 428/654, 684, 685; 75/134 B, 140, 138, 175 R

[56] References Cited

U.S. PATENT DOCUMENTS

| | | | |
|---|---|---|---|
| 2,586,099 | 2/1952 | Schultz | 428/645 |
| 2,741,016 | 4/1956 | Roach | 428/645 |
| 2,741,018 | 4/1956 | Schaefer | 308/237 R X |
| 2,852,365 | 9/1958 | Schlachter | 428/645 |
| 3,809,551 | 5/1974 | Morisaki | 75/140 |

FOREIGN PATENT DOCUMENTS

| | | | |
|---|---|---|---|
| 666087 | 2/1952 | United Kingdom | 428/645 |
| 722552 | 1/1955 | United Kingdom | 428/654 |

Primary Examiner—L. Dewayne Rutledge
Assistant Examiner—W. G. Saba
Attorney, Agent, or Firm—Karl W. Flocks

[57] ABSTRACT

A bearing metal for large size engines having excellent compatibility and as well as embeddability even when used under a poorly lubricated condition. Such bearing metal consists of three or four layers, including a layer of a bearing alloy which contains more than 50% and up to 65% by weight of tin, with the remainder being made up of aluminum, and which may also include less than 0.5% by weight of copper. This bearing alloy has a hardness at high temperature exceeding 100° C. lying between that of aluminum-tin bearing alloys which contain up to 50% by weight of tin and that of tin base or lead base white metal bearing alloys.

7 Claims, 5 Drawing Figures

BEARING METAL FOR LARGE ENGINES

CROSS REFERENCE TO RELATED APPLICATION

This application is a Continuation In Part Application of U.S. Application Ser. No. 795,331 filed May 9, 1977 by Sanae Mori and now abandoned without prejudice.

BACKGROUND OF THE INVENTION

The present invention relates to an improvement of a bearing metal, particularly the bearing metal that is suitable for accepting a swinging motion such as a cross-head pin bearing for large marine diesel engines.

Conventionally, white metals have been used as bearing alloys for such cross-head pin bearings. As internal combustion engines, however, have became more and more powerful, white metals have revealed inherent defects: they have had an extremely short service life due to failure from fatigue. Because of this drawback, aluminum-tin bearing alloys containing up to, but not including, 45% by weight of tin having longer life than that of white metals have been used increasingly.

But when they have been used in a very poorly lubricated site such as a cross-head bearing and under dusty conditions, they also had a defect that they were poor in compatibility and embeddability. Therefore, a bearing alloy superior in compatibility and more capable of being embedded compared to said aluminum tin bearing alloys that contain up to, but not including, 45% by weight of tin has been strongly desired by industry, but such alloys have not yet been established in the market.

However, British Patent Specification No. 722552 discloses the alloy wherein the tin composition is 50% by weight. In consideration that the conventional high-tin aluminum bearing alloys are generally limited to those containing 20 to 40% by weight of tin, there is occasionally illustrated the case in the British patent specification wherein the tin composition is 50% by weight and which is rather exceptional.

SUMMARY OF THE INVENTION

The object of the present invention is to offer a bearing metal for large size engines which is superior in stick-resistance and embeddability to said aluminum-tin bearing alloys containing more than 50% and up to 65% by weight of tin and further superior in fatigue strength to white metal, thus enabling to the solving of the above-mentioned defects.

According to the present invention, there is provided a bearing metal for large size engines consisting of three layers, i.e., a steel backing layer, an aluminum or aluminum alloy middle layer, and a bearing alloy layer; characterized in that the composition of said bearing alloy layer consists of more than 50% and up to 65% by weight of tin and the remainder substantially all aluminum and the bearing alloy has a hardness at high temperatures exceeding 100° C. lying between that of aluminum-tin bearing alloys which contain up to 50% by weight of tin and that of tin base or lead base white metal bearing alloys.

According to another aspect of the present invention, there is provided a bearing metal for large size engines consisting of three layers, i.e., a steel backing layer, an aluminum or said alloy middle layer, and a bearing alloy layer; characterized in that the composition of said bearing alloy layer consists of more than 50% and up to 65% by weight of tin, less than 0.5% by weight of copper and the remainder substantially being aluminum, and said bearing alloy has a hardness at high temperature exceeding 100° C. lying between that of aluminum-tin bearing alloys which contain up to 50% by weight of tin and that of tin base or lead base white metal bearing alloys.

According to a further aspect of the present invention, there is provided a bearing metal for large engines consisting of a steel backing layer, an aluminum or said alloy middle layer, a bearing alloy layer and a lead-base alloy surface layer; characterized in that the composition of the said bearing alloy layer consists of more than 50% and up to 65% by weight of tin and the remainder substantially being aluminum, and said bearing alloy has a hardness at high temperature exceeding 100° C. lying between that of aluminum-tin bearing alloys which contain up to 50% by weight of tin and that of tin base or lead base white metal bearing alloys.

According to a still further aspect of the present invention, there is provided a bearing metal for large engines consisting of a steel backing layer, an aluminum or said alloy middle layer, a bearing alloy layer and a lead-base alloy surface layer; characterized in that the composition of the said bearing alloy layer consists of more than 50% and up to 65% by weight of tin, less than 0.5% by weight of copper and the remainder substantially being aluminum, and said bearing alloy has a hardness at high temperature exceeding 100° C. lying between that of aluminum-tin bearing alloys which contain up to 50% by weight of tin and that of tin base or lead base white metal bearing alloys.

BRIEF DESCRIPTION OF THE DRAWINGS

FIG. 1 and FIG. 2 are schematic views, each showing the structure of a bearing metal;

FIG. 3 is a photomicrograph, magnification 100×, showing the structure in cross section taken parallel to the rolling direction of a bearing metal in accordance with the invention.

FIG. 4 is a photomicrograph, magnification also 100×, showing the structure in cross section taken transverse to the direction of the rolling of the bearing metal shown in FIG. 3.

DESCRIPTION OF THE INVENTION

Figure 1:
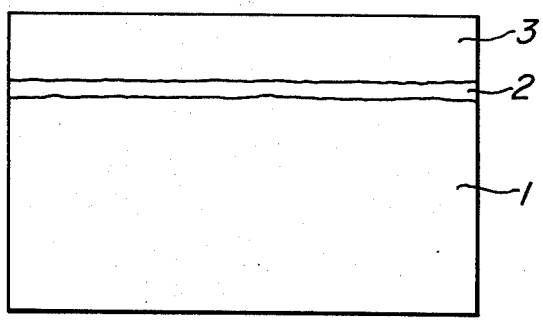
FIG. 1 through FIG. 4 illustrate the embodiments of the present invention.
Figure 2:
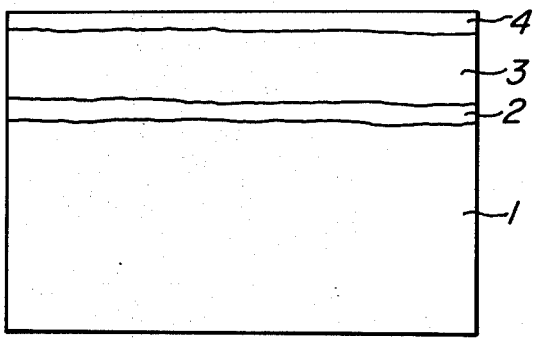

Referring now to FIG. 1 and FIG. 2, the steel backing layer 1 is normally made of a low carbon steel but both high carbon steel and high tension steel may also be used depending on the intended applications. For the middle layer 2, which serves to help to bond the steel backing layers 1 to bearing alloy layer 3, pure aluminum can be used but where further strength is required, an aluminum alloy with one or more of copper, silicon, manganese, nickel and zinc added with the total sum of less than 2%, may also be used. Tin, however, should not be added therein intentionally, as it hampers the adhesion.

Now the bearing alloy layer 3 is a layer which characterizes the present invention. This bearing alloy, unless it has more than 50% tin, would not have enough compatibility and embeddability, while on the other hand, if its tin content exceeds 65%, it will not only lose its sufficient fatigue strength but also become extremely difficult to manufacture.

Generally, this bearing alloy can be used without adding copper but if more strength is required or when it is desirable to improve its metalographic structure and adhesion to the surface layer, the addition of copper is effective. The addition in excess of 5%, however, makes the alloy so hard that it deteriorates in its initial conformity and embeddability. It also impairs the ductility of the alloy, and makes it too hard to be wrought.

Depending on the aimed purpose, the bearing alloy layer of the bearing metal can be added with one or more of nickel, silicon, antimony, manganese, lead and zinc with the total sum of less than 2% by weight. The purpose of the addition is to improve the mechanical strengths and the top limit is decided at 2% because when said total sum exceeds 2% by weight, it deteriorates the initial compatibility and embeddability. Here it is preferable that the hardness of the alloy not exceed that of the conventional aluminum-tin bearing alloy that contains tin up to 50% by weight.

The conventional aluminum-tin bearing alloy containing up to 50% by weight of tin is available in many types. Speaking of the typical composition of the alloy in more detail, such alloy having from 15% approximately up to 50% tin, 0-1% copper, all of which percentages being percentages by weight, with the remainder being substantially all aluminum is well known as the composition for the aluminum-tin bearing alloy.

Also the conventional well-known white metal bearing alloys can be divided into two types, namely, tin-base white metals and lead-base white metals. Japanese Industrial Standards (JIS) specifies White Metals class 1 to class 10 (WJ 1-10) as bearing materials. The practical temperature on the sliding surface of generally used bearing metals is known to exceed 100° C. under boundary lubricating condition. With respect to hardness at high temperatures exceeding 100° C., the bearing metal for large engines in accordance with the present invention should desirably be lower than the conventional aluminum-tin bearing alloys that contain up to 50% by weight of tin and higher than said well known white metal bearing alloys.

The alloy surface layer 4, mainly consisting of lead, is provided to improve the bearing characteristics such as anti-seizing, good embeddability and initial compatibility. Elements such as tin, copper, indium, etc. are usually added to lead in forming the alloy.

In case this surface layer 4 is bonded by means of electroplating, a thin layer of zincate and/or nickel plating (not shown) is sometimes provided between the bearing alloy layer 3 and the lead-base alloy surface layer 4. Beside electroplating, the said surface layer 4 can be bonded by spraying.

The bonding of the steel backing layer 1 to the aluminum or aluminum alloy middle layer 2 and the said middle layer 2 to the bearing alloy layer 3 of the prevent invention should preferably be made by usual roll welding but may be made by diffusion or pressure welding or by explosion welding as well. If the roll welding method is to be employed, it is effective to provide pure aluminum layer on the surface of bearing alloy of the present invention at the time of making the strip to prevent tin from coming out exceesively during the annealing. This pure aluminum layer can be removed at the time of finish machining.

Now the embodiments of the present invention will be described hereinafter.

Figure 3:
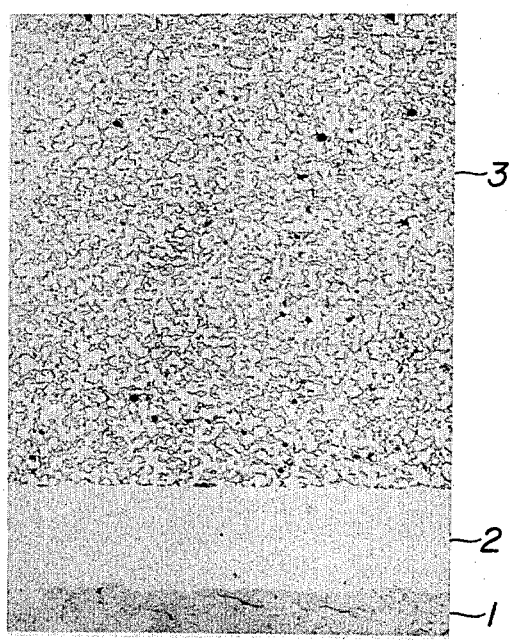
Figure 4:
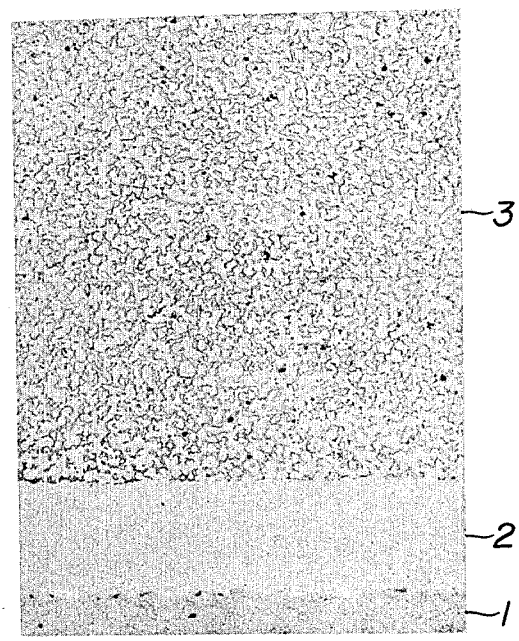

FIG. 3 and FIG. 4 show the microstructure of 100 magnifications of a bearing metal in accordance with the present invention. More particularly, FIG. 3 shows the microstructure in the cross section taken in a direction parallel to the rolling direction and FIG. 4 shows that in the cross section taken transverse to the roll direction of the same metal shown in FIG. 3. 1 is a low carbon steel backing layer; 2 is a pure aluminum layer; and 3 is a bearing alloy layer in accordance with the present invention (the alloy No. 3 in the table below). It was made by the well known cold roll welding method; that is, pure aluminum foils were first sandwiched between a steel sheet and the bearing alloy No. 3 of the present invention in the form of a thin plate and then they were cold rolled into a three-layer bearing metal. Both microphotographs show an excellent structure with fine and even distribution without any appreciable segregation.

Table

| Type of alloy | No. | Chemical composition (% by weight) | | | Mechanical properties | | Remarks |
|---|---|---|---|---|---|---|---|
| | | Sn | Cu | Al | Tensile strength (kg/cm$^2$) | Hardness at room (Hv) | temperature |
| Bearing alloy of the present invention | 1 | 51 | 0.4 | Remain | 9.6 | 26 | Aluminum-tin system bearing alloys |
| | 2 | 55 | 0.3 | Remain | 9.0 | 24 | |
| | 3 | 55 | — | Remain | 7.5 | 20 | |
| Conventional alloys | A | 40 | 1 | Remain | 11.0 | 33 | |
| | B | Modified JIS.WJ2 Type alloy consisting of Sb 9.0, Cu 4.5 plus innoculants Cd 0.7, Cr 0.1, Be 0.02 and remainder Sn | | | 10.5 | 32 | White metal bearing alloys |

As evident from the mechanical properties shown in the table above, the bearing alloys No. 1-3 of the present invention are slightly inferior to the conventional alloys A and B in tensile strength. But only to such an extent that it does not impair the bearing performance. On the other hand, the hardnesses at room temperature of the bearing alloys No. 1-3 of this invention are lower than those of the conventional alloys A and B. This means that the bearing alloys of the present invention are sufficiently capable of embedding the dust, which is one of the objects of the present invention.

Figure 5:
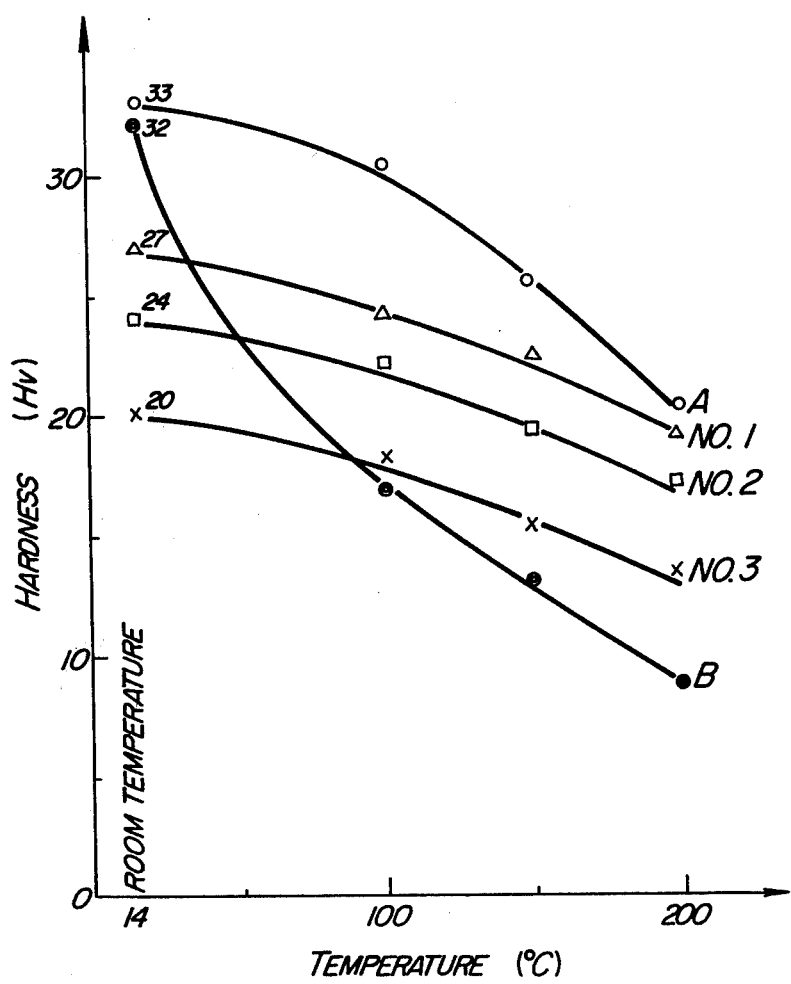
FIG. 5 is a graph showing the relation between hardness and temperature of the alloys.

FIG. 5 is a graph showing the hardnesses of each alloy measured over a temperature range from room temperature up to 200° C.

It is clearly seen in the graph that the bearing alloys of the present invention lies midway between the conventional alloys A and B with respect to the hardness at the temperature exceeding 100° C.

The bearing alloys of the present invention further exhibit an excellent fatigue strength which is an important factor in bearing alloys. This fact was proved by a continuous test of rotational loading as described below. The following is the result of the test.

Incidentally, although a cross-head bearing metal for a large diesel engine generally has a size of 450–800 mm in bearing diameter and 140–400 mm in bearing length, the bearing metals used as specimens for the testing were made smaller (62 mm in bearing diameter X 31 mm in bearing length) for the purpose of convenience in testing. The specimens had the structures and chemical compositions (%) corresponding to FIG. 1 through 4 and the table above-mentioned respectively. Chemical composition (%) of the surface layer 4 shown in FIG. 2 was 10% by weight of tin with the remainder being lead.

The fatigue test was carried out at a rotational speed of 3,000 r.p.m. and a peripheral speed of 9.73 m/sec under a forced lubrication for 20 hours with continuous running, and when the fractured section (area) reached 5% the total area of the plane of projection of the bearing surface, it was decided that the specimen reached the fatigue limit and the load immediately before the point was taken as the fatigue endurance stress limit.

In this test, the bearing alloys No. 1-3 of the present invention endured a maximum stress of 370 kg/cm$^2$ on the bearing surface, while the conventional alloy A endured the stress on the bearing surface of 460 kg/cm$^2$. As the maximum load which the large bearings are practically subjected is 200 kg/cm$^2$ at the most, the fatigue strength of the bearing alloys of the present invention does not raise any problems in practical use. On the other hand, the conventional alloy B endured a stress of only 160 kg/cm$^2$ applied on the bearing surface and at a pressure of 130 kg/cm$^2$ it reached extreme fatigue.

The bearing alloys of the present invention also exhibit an excellent compatibility which is very important for bearing alloys. This fact was confirmed by the following test on the bearing metals having the same structures and chemical compositions (%) as the specimens used for the fatigue test described above.

Testing Conditions

1. Testing machine:
    Suzuki type frictional wear testing machine
2. Load:
    Gradual and accumulative loading in the increment of approximately 14 kg/cm$^2$ each time from 14 kg/cm$^2$–138 kg/cm$^2$
3. Speed:
    1.3 m/sec
4. Lubrication:
    Motor oil: by SAE 30 oil bath method
5. Testing time:
    30 minutes each under each load
6. Repetition:
    5 times each
7. Evaluation on seizing:
    When either one of the following conditions was reached:
    (1) The frictional force exceeded 56 kg.
    (2) The temperature exceeded 200° C.

In this test, the conventional alloy (an aluminum-tin bearing alloy) A seized at testing loads of 55 kg/cm$^2$, 69 kg/cm$^2$ and 97 kg/cm$^2$. As for the conventional alloy (a white metal bearing alloy) B seized only once at the stage of 110 kg/cm$^2$ in testing load and showed no indication of seizing in the remaining 4 tests. On the other hand, the bearing alloys No. 1-3 of the present invention did not show any seizing whatever under accumulative loading in 10 steps from 14 to 138 kg/cm$^2$ loads.

What is claimed is:

1. A bearing metal for large engines consisting of three layers, a steel backing layer, an aluminum or aluminum alloy middle layer, and a bearing alloy layer; wherein the composition of the bearing alloy layer consists essentially of more than 50% and up to 65% by weight of tin, up to 0.5% by weight of copper and the remainder substantially being aluminum and the said bearing alloy having a hardness at high temperatures exceeding 100° C. lying between that of aluminum-tin bearing alloys which contain up to 50% by weight of tin and that of tin base or lead base white metal bearing alloys.

2. A bearing metal for large engines consisting of a steel backing layer, an aluminum or aluminum alloy middle layer, a bearing alloy layer and a lead-base alloy surface layer on the bearing alloy layer; wherein the composition of said bearing alloy layer consists essentially of more than 50% and up to 65% by weight of tin and the remainder substantially being aluminum, and said bearing alloy having a hardness at high temperatures exceeding 100° C. lying midway between that of aluminum-tin bearing alloys which contain up to 50% by weight of tin and that of tin base or lead base white metal bearing alloys.

3. A bearing metal for large engine consisting of a steel backing layer, an aluminum or aluminum alloy middle layer, a bearing alloy layer, and a lead-base alloy surface layer on the bearing alloy layer; wherein the composition of said bearing alloy layer consists essentially of more than 50% and up to 65% by weight of tin, up to 0.5% by weight of copper and the remainder substantially being aluminum, and the bearing alloy having a hardness at temperatures exceeding 100° C. lying between that of aluminum-tin bearing alloys which contain up to 50% by weight of tin, and that of tin base or lead base white metal bearing alloys.

4. A cross-head pin bearing for large marine diesel engines comprising
    a steel backing layer;
    a middle bonding layer of foil thickness and consisting of aluminum or aluminum alloy containing no added tin; and
    a bearing alloy layer disposed over said middle layer and consisting essentially of more than 50% and up to 65% by weight of tin with the remainder being substantially aluminum, said bearing alloy having a hardness at temperatures above 100° C. between that of aluminum-tin alloys containing up to 50% by weight tin and that of tin base or lead base white metal bearing alloys, whereby said bearing alloy has a hardness at 100° C. below 25 Hv and above 17 Hv, and a hardness at 200° C. less than 20 HV and greater than 12 Hv; and wherein said bearing alloy has a low hardness at room temperature not exceeding 27 Hv.

5. A bearing in accordance with claim 1, wherein said bearing alloy comprises approximately 55% by weight tin.

6. A bearing in accordance with claim 5, wherein said bearing alloy further comprises up to about 0.3% copper.

7. A bearing in accordance with claim 1, wherein said bearing alloy further comprises one or more of nickel, silicon, antimony, manganese, lead or zinc, with the total sum thereof being less than 2% by weight.

* * * * *

UNITED STATES PATENT OFFICE
CERTIFICATE OF CORRECTION

Patent No. 4,189,525  Dated February 19, 1980

Inventor(s) Sanae Mori

It is certified that error appears in the above-identified patent and that said Letters Patent are hereby corrected as shown below:

Item
[30]    Foreign Application Priority Data should read

-- May 13, 1976  [JP]  Japan ............. 51-54620 --.

Signed and Sealed this

Seventeenth Day of June 1980

[SEAL]

Attest:

SIDNEY A. DIAMOND

Attesting Officer     Commissioner of Patents and Trademarks